US010437463B2

(12) United States Patent
Forsblom et al.

(10) Patent No.: US 10,437,463 B2
(45) Date of Patent: Oct. 8, 2019

(54) MOTION-BASED GRAPHICAL INPUT SYSTEM

(71) Applicant: LUMINI CORPORATION, San Diego, CA (US)

(72) Inventors: Nils Forsblom, San Diego, CA (US); Angelo Scandaliato, San Diego, CA (US); Maximilian Metti, San Diego, CA (US); Pablo Garcia, San Diego, CA (US)

(73) Assignee: Lumini Corporation, La Quinta, CA (US)

( * ) Notice: Subject to any disclaimer, the term of this patent is extended or adjusted under 35 U.S.C. 154(b) by 0 days.

(21) Appl. No.: 15/295,907

(22) Filed: Oct. 17, 2016

(65) Prior Publication Data

US 2017/0109036 A1    Apr. 20, 2017

Related U.S. Application Data

(60) Provisional application No. 62/242,947, filed on Oct. 16, 2015.

(51) Int. Cl.
*G06F 9/451*    (2018.01)
*G06F 3/0488*    (2013.01)
(Continued)

(52) U.S. Cl.
CPC .......... *G06F 3/04883* (2013.01); *G06F 3/017* (2013.01); *G06F 3/0346* (2013.01);
(Continued)

(58) Field of Classification Search
CPC .. G06F 3/0487; G06F 3/04883; G06F 3/0346; G06F 3/04815; G06F 9/4446;
(Continued)

(56) References Cited

U.S. PATENT DOCUMENTS 5,534,917 A    7/1996    Macdougall
7,058,204 B2    6/2006    Hildreth et al.
(Continued)

FOREIGN PATENT DOCUMENTS

WO    WO2002039063    5/2002

OTHER PUBLICATIONS

Canadian Trademark Registration No. TMA700194; Registered Nov. 6, 2007; Owned by Qualcomm Incorporated.
(Continued)

*Primary Examiner* — Towfiq Elahi
(74) *Attorney, Agent, or Firm* — Stetina Brunda Garred & Brucker (57) ABSTRACT

An apparatus for generating a graphical representation of a motion input applied to one or more sensors includes a touch input display screen and a motion input capture module receptive to data corresponding to the motion input applied to and detected by the one or more sensors. A graphical user interface is generated on the touch input display screen with a view of a virtual three-dimensional space displayed thereon, and has a virtual space viewing mode and a brush stroke input mode. In the virtual space viewing mode, the view of the virtual three-dimensional space is adjustable in response to motion input. In the brush stroke input mode, a stroke path defined by a plurality of position points within the virtual three-dimensional space and derived from data corresponding to the motion input is generated.

23 Claims, 9 Drawing Sheets

(51) Int. Cl.
*G06F 3/0346* (2013.01)
*G06F 3/0481* (2013.01)
*G06F 3/0487* (2013.01)
*G06F 3/01* (2006.01)

(52) U.S. Cl.
CPC ........ *G06F 3/0487* (2013.01); *G06F 3/04815* (2013.01); *G06F 9/453* (2018.02); *G06F 2203/0381* (2013.01); *G06F 2203/04801* (2013.01)

(58) Field of Classification Search
CPC ............. G06F 3/017; G06F 2203/0381; G06F 2203/04801; G06T 11/203
See application file for complete search history.

(56) References Cited

U.S. PATENT DOCUMENTS

| | | | |
|---|---|---|---|
| 7,227,526 | B2 | 6/2007 | Hildreth et al. |
| 7,379,566 | B2 | 5/2008 | Hildreth |
| 7,389,591 | B2 | 6/2008 | Jaiswal et al. |
| 8,631,358 | B2 | 1/2014 | Louch |
| 9,299,092 | B1 | 3/2016 | Brown et al. |
| 2005/0238201 | A1 | 10/2005 | Shamaie |
| 2007/0090180 | A1 | 4/2007 | Griffis et al. |
| 2007/0136132 | A1 | 6/2007 | Weiser et al. |
| 2008/0147493 | A1 | 6/2008 | Aarnio et al. |
| 2009/0029720 | A1 | 1/2009 | Jaffe et al. |
| 2009/0157341 | A1 | 6/2009 | Cheung |
| 2009/0184849 | A1 | 7/2009 | Nasiri et al. |
| 2009/0319166 | A1 | 12/2009 | Khosravy et al. |
| 2010/0114562 | A1 | 6/2010 | Georgi et al. |
| 2010/0257475 | A1 | 10/2010 | Smith et al. |
| 2010/0269030 | A1 | 10/2010 | Dugonjic et al. |
| 2011/0173204 | A1 | 7/2011 | Murillo et al. |
| 2011/0191024 | A1 | 8/2011 | Deluca |
| 2011/0238308 | A1 | 9/2011 | Miller et al. |
| 2011/0270679 | A1 | 11/2011 | Tziortzis et al. |
| 2011/0288913 | A1 | 11/2011 | Waylonis et al. |
| 2012/0036003 | A1 | 2/2012 | Tong et al. |
| 2012/0041767 | A1 | 2/2012 | Hoffman et al. |
| 2012/0131454 | A1 | 5/2012 | Shah |
| 2012/0246596 | A1 | 9/2012 | Ording et al. |
| 2012/0265595 | A1 | 10/2012 | Corner et al. |
| 2012/0310717 | A1 | 12/2012 | Kankainen |
| 2013/0166397 | A1 | 6/2013 | Byun et al. |
| 2013/0211923 | A1 | 8/2013 | Yuill et al. |
| 2013/0211924 | A1 | 8/2013 | Yuill et al. |
| 2013/0218680 | A1 | 8/2013 | Forsblom |
| 2014/0023087 | A1 | 1/2014 | Czompo |
| 2014/0278853 | A1 | 9/2014 | Brown et al. |
| 2014/0280517 | A1 | 9/2014 | White et al. |
| 2014/0282088 | A1 | 9/2014 | Kakani et al. |
| 2014/0288873 | A1 | 9/2014 | Czompo et al. |
| 2014/0316884 | A1 | 10/2014 | Munisamy |
| 2014/0344055 | A1 | 11/2014 | Sanghavi et al. |
| 2014/0352400 | A1 | 12/2014 | Barrilado et al. |
| 2015/0046247 | A1 | 2/2015 | Rajappa |
| 2015/0081448 | A1 | 3/2015 | Osotio et al. |
| 2015/0095160 | A1 | 4/2015 | Ma |
| 2015/0120458 | A1 | 4/2015 | Lee et al. |
| 2015/0286279 | A1 | 10/2015 | Lim et al. |
| 2016/0292742 | A1 | 10/2016 | Kang et al. |

OTHER PUBLICATIONS

Olive Media Canada, Infiniti JX Tablet Advertisement by Olive Mobile, video, https://www.youtube.com/watch?v=KGIWebpdmYE#t=79, published May 29, 2012, 2 pages.

Rachel Lamb, Infiniti releases first touch-screen ad for JX, web page, http://www.luxurydaily.com/infinitireleasesfirsttouchscreenad-forxj/, Jun. 7, 2012, 4 pages.

Leadbolt, LeadBolt Launches Industry's First and Only Mobile Ad Format to Utilize Gyroscope Technology, web page, http://www.businesswire.com/news/home/20131217005561/en/LeadBolt-Launches-Industry%E2%80%99s-Mobile-Ad-Format-Utilize, Dec. 17, 2013, 2 pages.

Medialets, Medialets Shakes Up Mobile Advertising, web page, https://www.medialets.com/medialetsshakesupmobileadvertising/, Apr. 22, 2009, 3 pages.

Forbes, Shaking Up Advertising, web page, http://www.forbes.com/2009/03/16dockersmobileadvertisingleadershipcmonetworkmobilemarketing.Html, Mar. 16, 2009, 4 pages.

Rebecca Borison, Tic Tac sees 7.94pc engagement rate with richmedia ad, web page, http://www.mobilemarketer.com/cms/news/advertising/16631.html, Nov. 19, 2013, 4 pages.

Medialets, World's First Shakable Ad™ by Medialets, video, https://www.youtube.com/watch?v=NwnuwGhcpRU, uploaded Apr. 11, 2009, 2 pages.

David Talbot, What Apple's M7 Motion-Sensing Chip Could Do, Sep. 25, 2013, 2 Pages.

Chris Brandrick, Apple's M7 Chip Is the Trojan Horse for Its Wearable Computing Plans, Sep. 13, 2013, 7 Pages.

International Search Report and Written Opinion for PCT/US14/69554; dated Mar. 6, 2015; 11 pages.

International Search Report and Written Opinion for International Application No. PCT/US2016/044318; dated Oct. 7, 2016; 12 pages.

MOTION-BASED GRAPHICAL INPUT SYSTEM

CROSS-REFERENCE TO RELATED APPLICATIONS

This application relates to and claims the benefit of U.S. Provisional Application No. 62/242,947 filed Oct. 16, 2015 and entitled "MOTION-BASED GRAPHICAL INPUT SYSTEM," the entirety of the disclosure of which is wholly incorporated by reference herein.

STATEMENT RE: FEDERALLY SPONSORED RESEARCH/DEVELOPMENT

Not Applicable

BACKGROUND

1. Technical Field

The present disclosure relates generally to human-computer interfaces and mobile devices, and more particularly, to motion-based graphical input systems.

2. Related Art

Mobile devices fulfill a variety of roles, from voice communications and text-based communications such as Short Message Service (SMS) and e-mail, to calendaring, task lists, and contact management, as well as typical Internet based functions such as web browsing, social networking, online shopping, and online banking. With the integration of additional hardware components, mobile devices can also be used for photography or taking snapshots, navigation with mapping and Global Positioning System (GPS), cashless payments with NFC (Near Field Communications) point-of-sale terminals, and so forth. Such devices have seen widespread adoption in part due to the convenient accessibility of these functions and more from a single portable device that can always be within the user's reach.

Although mobile devices can take on different form factors with varying dimensions, there are several commonalities between devices that share this designation. These include a general purpose data processor that executes pre-programmed instructions, along with wireless communication modules by which data is transmitted and received. The processor further cooperates with multiple input/output devices, including combination touch input display screens, audio components such as speakers, microphones, and related integrated circuits, GPS modules, and physical buttons/input modalities. More recent devices also include accelerometers and compasses that can sense motion and direction. For portability purposes, all of these components are powered by an on-board battery. In order to accommodate the low power consumption requirements, ARM architecture processors have been favored for mobile devices. Several distance and speed-dependent communication protocols may be implemented, including longer range cellular network modalities such as GSM (Global System for Mobile communications), CDMA, and so forth, high speed local area networking modalities such as WiFi, and close range device-to-device data communication modalities such as Bluetooth.

Management of these hardware components is performed by a mobile operating system, also referenced in the art as a mobile platform. The mobile operating system provides several fundamental software modules and a common input/output interface that can be used by third party applications via application programming interfaces.

User interaction with the mobile device, including the invoking of the functionality of these applications and the presentation of the results therefrom, is, for the most part, restricted to the graphical touch user interface. That is, the extent of any user interaction is limited to what can be displayed on the screen, and the inputs that can be provided to the touch interface are similarly limited to what can be detected by the touch input panel. Touch interfaces in which users tap, slide, flick, pinch regions of the sensor panel overlaying the displayed graphical elements with one or more fingers, particularly when coupled with corresponding animated display reactions responsive to such actions, may be more intuitive than conventional keyboard and mouse input modalities associated with personal computer systems. Thus, minimal training and instruction is required for the user to operate these devices.

However, mobile devices must have a small footprint for portability reasons. Depending on the manufacturer's specific configuration, the screen may be three to five inches diagonally. One of the inherent usability limitations associated with mobile devices is the reduced screen size; despite improvements in resolution allowing for smaller objects to be rendered clearly, buttons and other functional elements of the interface nevertheless occupy a large area of the screen. Accordingly, notwithstanding the enhanced interactivity possible with multi-touch input gestures, the small display area remains a significant restriction of the mobile device user interface. This limitation is particularly acute in graphic arts applications, where the canvas is effectively restricted to the size of the screen. Although the logical canvas can be extended as much as needed, zooming in and out while attempting to input graphics is cumbersome, even with the larger tablet form factors.

Expanding beyond the confines of the touch interface, some app developers have utilized the integrated accelerometer as an input modality. Some applications such as games are suited for motion-based controls, and typically utilize roll, pitch, and yaw rotations applied to the mobile device as inputs that control a on-screen element. Along these lines, more recent remote controllers for video game console systems also have incorporated accelerometers such that motion imparted to the controller is translated to a corresponding virtual action displayed on-screen. Accelerometer data can also be utilized in other contexts, particularly those that are incorporated into wearable devices. However, in these applications, the data is typically analyzed over a wide time period and limited to making general assessments of the physical activity of a user.

Because motion is one of the most native forms of interaction between human beings and tangible objects, it would be desirable to utilize such inputs to the mobile device for controlling user interface elements thereof. It would also be desirable to expand the canvas in graphical design applications, and to capture motion imparted to the mobile device as input strokes that are translated to graphics on the screen.

BRIEF SUMMARY

The present disclosure contemplates various devices and methods for motion-based graphical inputs. A mobile communications device with micro-electro-mechanical systems (MEMS) may be utilized as a virtual brush, with the three-dimensional space within which the mobile communications device is moved serving as a canvas. The motion imparted to the mobile device may be captured by the sensors and transformed into a graphical representation that is shown on the display screen. Various artistic applications are envisioned.

In accordance with one embodiment, there is an apparatus for generating a graphical representation of a motion input applied to one or more sensors. The apparatus may include a touch input display screen, and a motion input capture module receptive to data corresponding to the motion input applied to and detected by the one or more sensors. There may also be a graphical user interface that is generated on the touch input display screen with a view of a virtual three-dimensional space being displayed thereon. The graphical user interface may also include one or more interactive elements that are activatable in response to an input received on the touch input display screen. The graphical user interface may have a virtual space viewing mode and a brush stroke input mode. In the virtual space viewing mode, the view of the virtual three-dimensional space may be adjustable in response to the motion input as detected by the one or more sensors based upon the data received by the motion input capture module. In the brush stroke input mode, a stroke path derived from data corresponding to the motion input as detected by the one or more sensors may be generated. The stroke path may be defined by a plurality of position points within the virtual three-dimensional space, each relative to a starting point.

In accordance with another embodiment of the present disclosure, there is a method for graphically representing an input stroke corresponding to a motion applied to a sensor device and defined by one or more position points within a three-dimensional space. The method may include a step of receiving acceleration data referenced to a device frame as generated by an accelerometer on the sensor device. The acceleration data may correspond to the input stroke applied to the sensor device. There may also be a step of transforming the received acceleration data referenced to the device frame to a world frame corresponding to the three dimensional space based upon orientation data. The method may also include integrating the transformed acceleration data referenced to the world frame to generate velocity data, and then generating a velocity data drift approximation. Furthermore, the method may include a step of correcting the velocity data by the velocity data drift approximation. There may additionally be a step of integrating the corrected velocity data to generate the position points of the input stroke. Each of the position points may be defined relative to a starting point within the three-dimensional space. This method may be implemented as a series of instructions executable by a data processor and tangibly embodied in a program storage medium.

The present invention will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

The present disclosure contemplates various embodiments of capturing motion inputs and generating graphical representations thereof. To this end, apparatuses and methods are disclosed. The detailed description set forth below in connection with the appended drawings is intended as a description of the several presently contemplated embodiments, and is not intended to represent the only form in which the disclosed invention may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Figure 1:
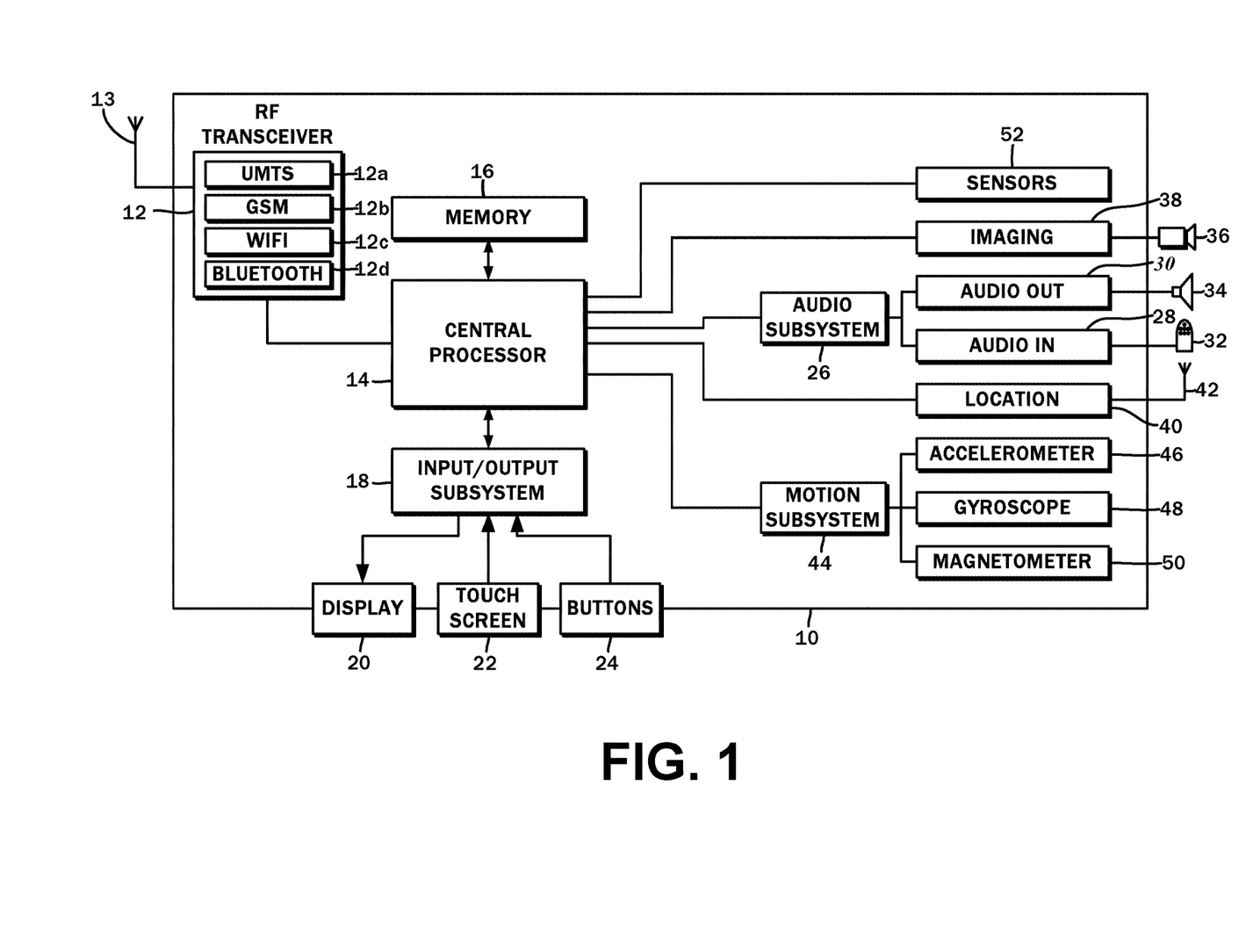
FIG. 1 is a block diagram illustrating the components of a mobile device utilized in various embodiments of the present disclosure.

FIG. 1 illustrates one exemplary mobile device 10 on which various embodiments of the present disclosure may be implemented. The mobile device 10 may be a smartphone, and therefore include a radio frequency (RF) transceiver 12 that transmits and receives signals via an antenna 42. Conventional devices are capable of handling multiple wireless communications modes simultaneously. These include several digital phone modalities such as UMTS (Universal Mobile Telecommunications System), 4G LTE (Long Term Evolution), and the like. For example, the RF transceiver 12 includes a UMTS module 12a. To the extent that coverage of such more advanced services may be limited, it may be possible to drop down to a different but related modality such as EDGE (Enhanced Data rates for GSM Evolution) or GSM (Global System for Mobile communications), with specific modules therefor also being incorporated in the RF transceiver 12, for example, GSM module 12b. Aside from multiple digital phone technologies, the RF transceiver 12 may implement other wireless communications modalities such as WiFi for local area networking and accessing the Internet by way of local area networks, and Bluetooth for linking peripheral devices such as headsets. Accordingly, the RF transceiver may include a WiFi module 12c and a Bluetooth module 12d. The enumeration of various wireless networking modules is not intended to be limiting, and others may be included without departing from the scope of the present disclosure.

The mobile device 10 is understood to implement a wide range of functionality through different software applications, which are colloquially known as "apps" in the mobile device context. The software applications are comprised of pre-programmed instructions that are executed by a central processor 14 and that may be stored on a memory 16. The results of these executed instructions may be output for viewing by a user, and the sequence/parameters of those instructions may be modified via inputs from the user. To this end, the central processor 14 interfaces with an input/output subsystem 18 that manages the output functionality of a display 20 and the input functionality of a touch screen 22 and one or more buttons 24.

In a conventional smartphone device, the user primarily interacts with a graphical user interface that is generated on the display 20 and includes various user interface elements that can be activated based on haptic inputs received on the touch screen 22 at positions corresponding to the underlying displayed interface element. One of the buttons 24 may serve a general purpose escape function, while another may serve to power up or power down the mobile device 10. Additionally, there may be other buttons and switches for controlling volume, limiting haptic entry, and so forth. Those having ordinary skill in the art will recognize other possible input/output devices that could be integrated into the mobile device 10, and the purposes such devices would serve. Other smartphone devices may include keyboards (not shown) and other mechanical input devices, and the presently disclosed interaction methods with the graphical user interface detailed more fully below are understood to be applicable to such alternative input modalities.

The mobile device 10 includes several other peripheral devices. One of the more basic is an audio subsystem 26 with an audio input 28 and an audio output 30 that allows the user to conduct voice telephone calls. The audio input 28 is connected to a microphone 32 that converts sound to electrical signals, and may include amplifier and ADC (analog to digital converter) circuitry that transforms the continuous analog electrical signals to digital data. Furthermore, the audio output 30 is connected to a loudspeaker 34 that converts electrical signals to air pressure waves that result in sound, and may likewise include amplifier and DAC (digital to analog converter) circuitry that transforms the digital sound data to a continuous analog electrical signal that drives the loudspeaker 34. Furthermore, it is possible to capture still images and video via a camera 36 that is managed by an imaging module 38.

Due to its inherent mobility, users can access information and interact with the mobile device 10 practically anywhere. Additional context in this regard is discernible from inputs pertaining to location, movement, and physical and geographical orientation, which further enhance the user experience. Accordingly, the mobile device 10 includes a location module 40, which may be a Global Positioning System (GPS) receiver that is connected to a separate antenna 42 and generates coordinates data of the current location as extrapolated from signals received from the network of GPS satellites. Motions imparted upon the mobile device 10, as well as the physical and geographical orientation of the same, may be captured as data with a motion subsystem 44, in particular, with an accelerometer 46, a gyroscope 48, and a compass or magnetometer 50, respectively. The accelerometer 46 and the gyroscope 48 are three-axis types, that is, three sets of data corresponding to the x, y, and z axes are generated therefrom. Although in some embodiments the accelerometer 46, the gyroscope 48, and the magnetometer 50 directly communicate with the central processor 14, more recent variations of the mobile device 10 utilize the motion subsystem 44 that is embodied as a separate co-processor to which the acceleration and orientation processing is offloaded for greater efficiency and reduced electrical power consumption. One exemplary embodiment of the mobile device 10 is the Apple iPhone with the M7 motion co-processor.

The components of the motion subsystem 44, including the accelerometer 46, the gyroscope 48, and the compass or magnetometer 50, while shown as integrated into the mobile device 10, may be incorporated into a separate, external device. This external device may be wearable by the user and communicatively linked to the mobile device 10 over the aforementioned data link modalities. The same physical interactions contemplated with the mobile device 10 to invoke various functions as discussed in further detail below may be possible with such external wearable device.

There are other sensors 52 that can be utilized in the mobile device 10 for different purposes. For example, one of the other sensors 52 may be a proximity sensor to detect the presence or absence of the user to invoke certain functions, while another may be a light sensor that adjusts the brightness of the display 20 according to ambient light conditions. Those having ordinary skill in the art will recognize that other sensors 52 beyond those considered herein are also possible.

Figure 2:
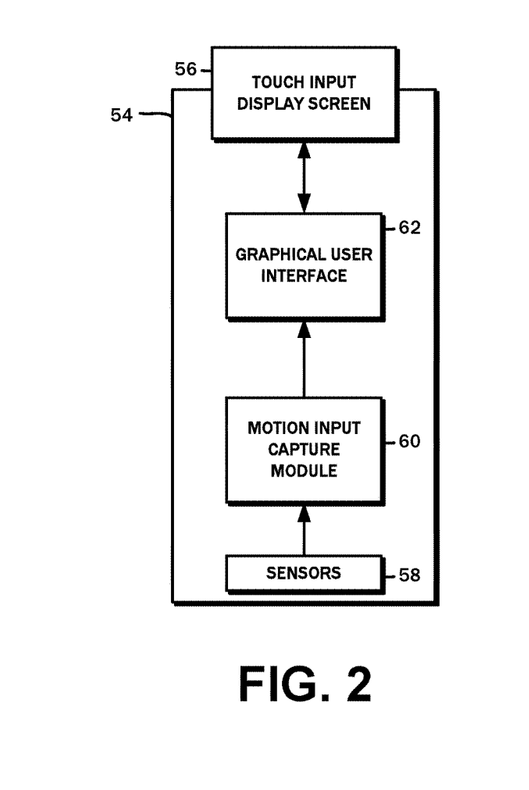
FIG. 2 is a block diagram depicting one embodiment of an apparatus for generating a graphical representation of a motion input applied thereto.

One embodiment of the present disclosure is directed to an apparatus 54 for generating a graphical representation of a motion input that is applied to one or more sensors. The block diagram of FIG. 2 illustrates one possible implementation of such apparatus 54 and its foundational components. In some embodiments, the apparatus 54 is understood to correspond generally to the aforementioned mobile device 10, though this is by way of example only and not of limitation. The basic configuration of the apparatus 54 may be comprised of a touch input display screen 56, which may be comprised of the display 20 and the touch screen 22 of the mobile device 10.

Additionally, with respect to hardware components, there are one or more sensors 58 that correspond to the aforementioned accelerometer 46, gyroscope 48, and magnetometer 50. The sensors 58 are understood to be disposed on a sensor unit, which in most embodiments of the apparatus 54 are integral with the other circuitry of the underlying mobile device 10. However, in some cases, the sensor unit may be disposed on a physically separate circuit, or on a wearable device that is not part of the mobile device 10 and only communicating therewith. Examples of such wearable devices include smart watches that have touch display screens and on-board motion sensors that communicate directly with the mobile device 10. The raw sensor data is provided to a motion input capture module 60, and is understood to correspond to the spatial motion input applied to the sensor unit.

Figure 3:
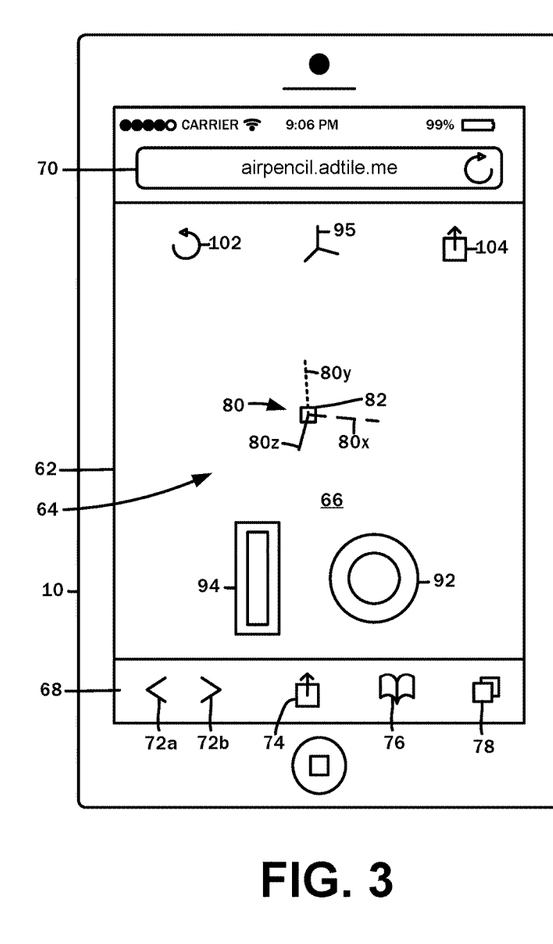
FIG. 3 depicts an exemplary graphical user interface in accordance with various embodiments of the present disclosure.

The apparatus 54 also includes a graphical user interface 62, which in one embodiment is implemented as a logical module comprised of a series of pre-programmed instructions that can be executed by the central processor 14 of the mobile device 10. These instructions may collectively make up a standalone application that runs natively on the mobile device 10, though in other embodiments, it may be a lightweight application that is downloaded to and executed by a web browser running on the mobile communications device. The screen capture of FIG. 3 shows an embodiment of the graphical user interface 62, which is generally comprised of a view area 64 for a virtual three-dimensional space 66. The graphical user interface 62 is presented within a web browser application interface 68, which includes the standard interface elements of an address bar 70, back button 72a, forward button 72b, a content share button 74, a bookmark button 76, and a window tab button 78, each of which are understood to invoke corresponding functions of the web browser application that are known in the art.

When the application is initially loaded, a three-axis helper 80 is displayed in a center region of the view area 64. The three-axis helper 80 includes an x-axis indicator 80x, a y-axis indicator 80y, and a z-axis indicator 80z that show the current extent of offset along each of these axes of the view area 64 relative to the virtual three-dimensional space 66. Additionally, there is a position indicator 82 that is initially centered at an origin point within the virtual three-dimensional space 66.

Figure 4A:
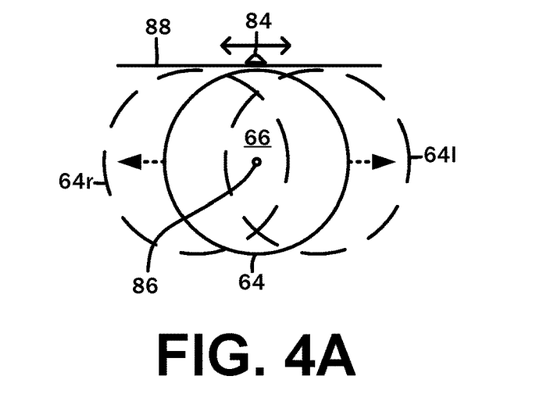
FIGS. 4A-4C show exemplary panning, zooming, and rotating a view of a virtual three-dimensional space.
Figure 4B:
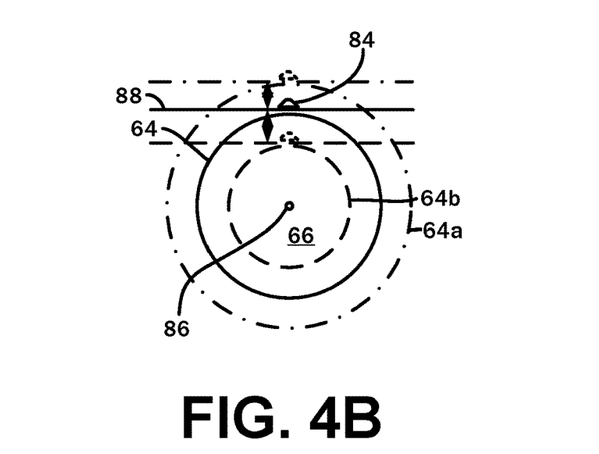
Figure 4C:
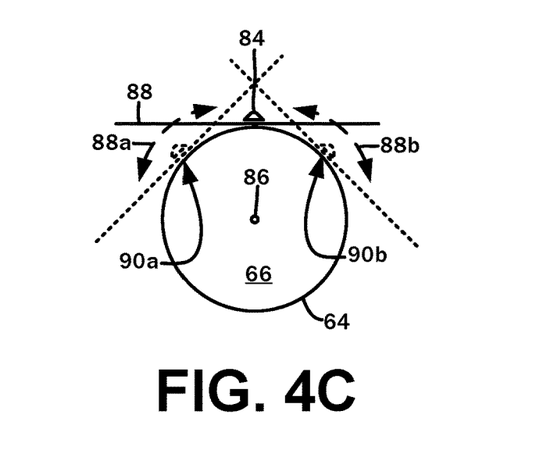

Referring now to FIGS. 4A-4C, different ways of navigating the virtual three-dimensional space 66 are illustrated. For the sake of simplicity, only a top plan view of the virtual three-dimensional space 66 is depicted. There is a simulated camera 84 that represents a viewport to the virtual three-dimensional space 66, and the circular regions shown generally correspond to the view area 64. Thus, in an actual implementation, the view area 64 may be spherical. Furthermore, while the view area 64 is shown with specific boundaries, it is understood that the virtual three-dimensional space 66 will extend further out to infinity. The view area 64 is also characterized by a center point 86 that constitutes the focus point of the camera 84.

FIG. 4A illustrates a panning operation. The camera 84 is moved along a view plane 88 that is tangent to the circular region constituting the view area 64. In this regard, the center point 86 is understood to move with the view area. A circular region 64r is the view from the camera 84 panned to the right, while a circular region 64l is the view from the camera 84 panned to the left. Although the foregoing is considered in terms of left and right panning, the view area 64 is understood to be spherical, so upward and downward panning is also contemplated.

FIG. 4B illustrates a zooming operation. The camera 84 remains in the same orientation and in the same position of the view plane 88, but the view plane 88 is moved closer to and further away from the center point 86. Thus, the view area 64 may be expanded per circular region 64a with the camera 84 further away from the center point 86, while the view area 64 may be narrowed per circular region 64b with the camera 84 closer to the center point 86.

FIG. 4C illustrates a rotation operation. The camera 84 is rotated about the center point 86 while the view area 64 remains the same, and the angle of view from the camera 84 to the center point 86 is modified. In other words, the tangent point of the view plane 88 relative to the view area 64 is moved. For instance, with the camera 84 rotated leftward, the view plane 88a is tangent to the circular region corresponding to the view area 64 at point 90a, and with the camera 84 rotated rightward, the view plane 88c is tangent to the circular region corresponding to the view area 64 at a point 90b. Although the foregoing is considered in terms of left and right rotation, the view area 64 is understood to be spherical, so upward and downward rotation is possible.

The foregoing operations may be invoked with inputs to the apparatus 54. More particularly, the panning and zooming operations may be invoked via interactive elements presented on the graphical user interface 62 that are activatable in response to a haptic input upon the touch input display screen 56. There is an omnidirectional panning joystick 92 that can be moved in various directions, and the view area 64 is panned in the activation direction in response. Additionally, there is a zooming joystick 94 that can be moved upward and downward to respectively increase and decrease the zoom level or otherwise expand or contract the view are 64 of the virtual three-dimensional space 66. The rotation operations may be invoked by imparting a physical rotation motion upon the apparatus 54. In this regard, the motion input capture module 60 receives the data from the sensors 58, and the view area 64 is adjusted in response.

The graphical user interface 62 is understood to be defined by a virtual space viewing mode and as will be described in further detail below, a brush stroke input mode. The panning, zooming, and rotating operations are accessible when the graphical user interface 62 is in the virtual space viewing mode. The view area 64 may be reset by activating a view reset button 95.

The present disclosure contemplates the capture of motion imparted to the apparatus 54 or as detected by the sensors 58, and converting the representative data to a graphical form. This is understood to take place in the brush stroke input mode, which may be invoked by providing a capture initiation command. In some embodiments, the capture process begins when a haptic input is received on the touch input display screen on any part of the graphical user interface 62 not corresponding to any displayed interactive elements, e.g., inside the view area 64. The capture process may continue while the haptic input is being provided, and stops when released. The process may be repeated to input multiple sets of movements.

Figure 5A:
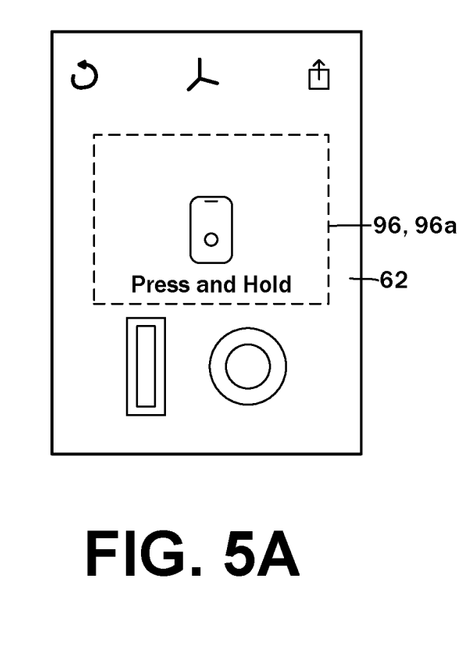
FIGS. 5A-5C are screen captures of an application startup instructional overlay that may be presented on the graphical user interface.
Figures 5B, 5C:
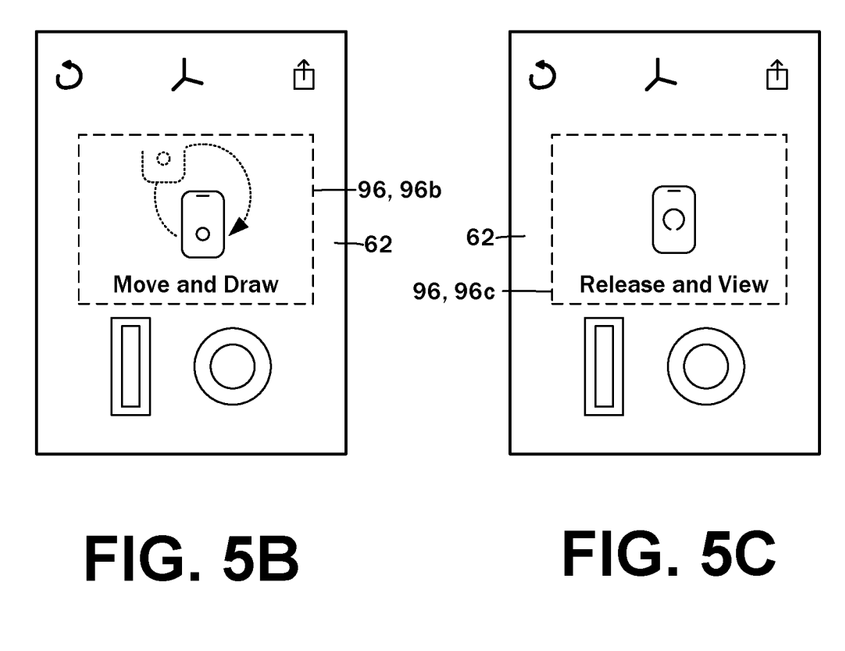
Figure 6:
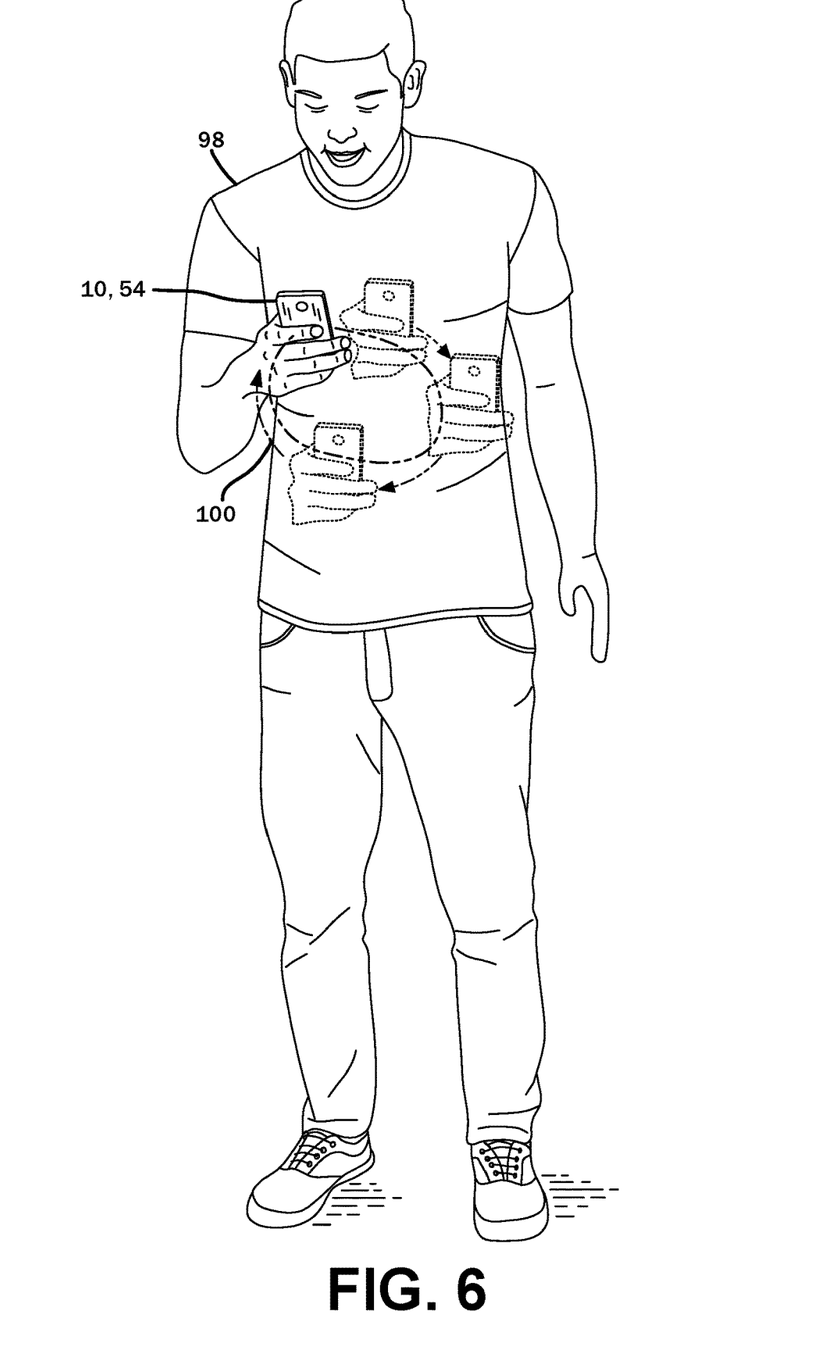
FIG. 6 shows a user providing a motion input to a mobile communications device in accordance with various embodiments of the present disclosure.

As a guide to the user, upon the application being first invoked, a series of instructions may be presented. Referring now to the screen captures of FIGS. 5A-5C, an instructional overlay 96 may be generated on the graphical user interface 62. In a first segment 96a, an icon representative of the apparatus 54 may be shown, together with an instructional text "Press and Hold." After a suitable duration of displaying the first segment 96a, there may be a transition to a second segment 96b in which the icon is animated to indicate movement, along with an instructional text "Move and Draw." After another suitable duration of display the second segment 96b, there may be a transition to a third segment 96c in which the animation is stopped, and the icon is changed to include a sample captured motion along the lines of what was illustrated in the second segment 96b, together with an instructional text "Release and View." The foregoing sequence may be repeated until some input is provided, thereafter transitioning to the display as shown in FIG. 3 without the instructional overlay 96. The foregoing description of the instructional overlay 96 and the text/graphic contents thereof are presented by way of example only and not of limitation, and any other suitable instructions may be shown without departing from the scope of the present disclosure.

As shown in FIG. 5, physical motion imparted to the apparatus 54 by the user 98 as one or more stroke paths 100 is captured, recorded, and converted to a graphical form while in the brush stroke input mode. Motion imparted to the apparatus 54 while in the virtual space viewing mode is also captured, but not converted to the graphical form, and instead is effective to move the origination point from which further movement of the apparatus 54, in either the brush stroke input mode or the virtual space viewing mode, is determined. The origination point is designated with the aforementioned position indicator 82.

Figure 7A:
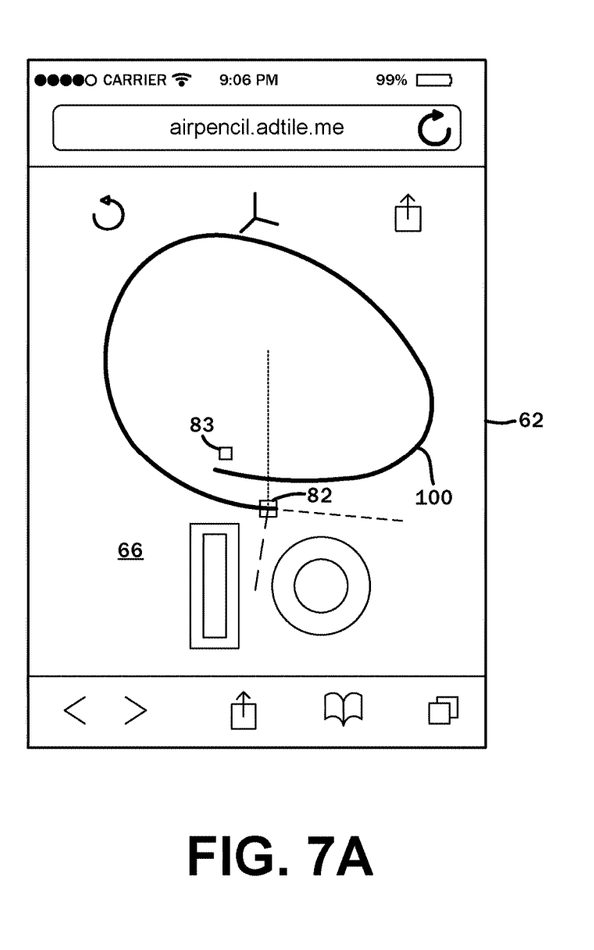
FIGS. 7A-7B are screen captures showing graphical representations of various input strokes.
Figure 7B:
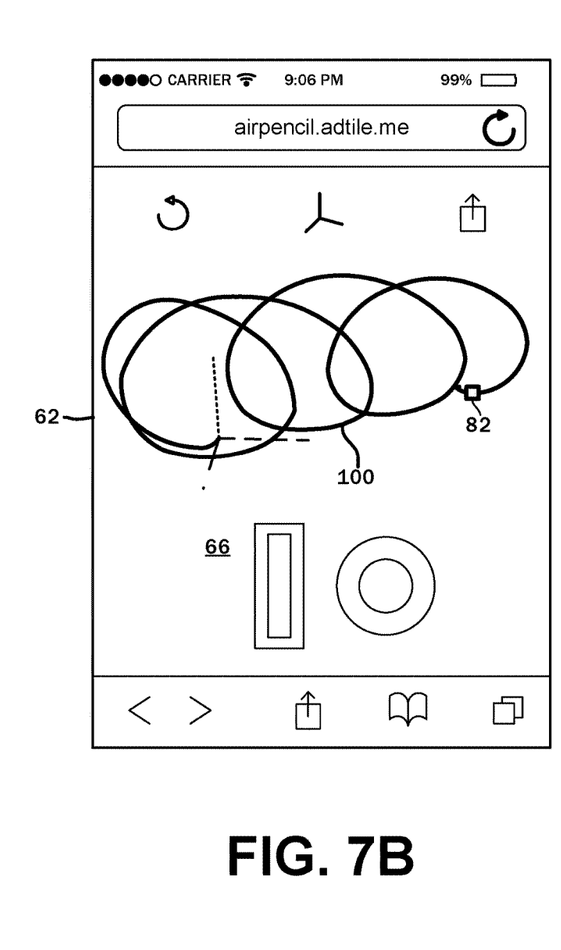

The example of FIG. 7A illustrates a single stroke path 100 defined by an origin as designated by the position indicator 82, and ending in a position within the virtual three-dimensional space 66 designated by an ending position indicator 83. FIG. 7B also illustrates a single stroke path 100 comprised of multiple overlapping segments that corresponds to the apparatus 54 being laterally looped. According to one embodiment, the stroke path 100 may be displayed as the motion input is provided, upon completion of the motion input with the detection of the apparatus 54 being stationary, or upon release of the haptic input from the graphical user interface 62. Existing stroke paths 100 in the view area 64 may be cleared by activating a reset button 102.

Figure 8A:
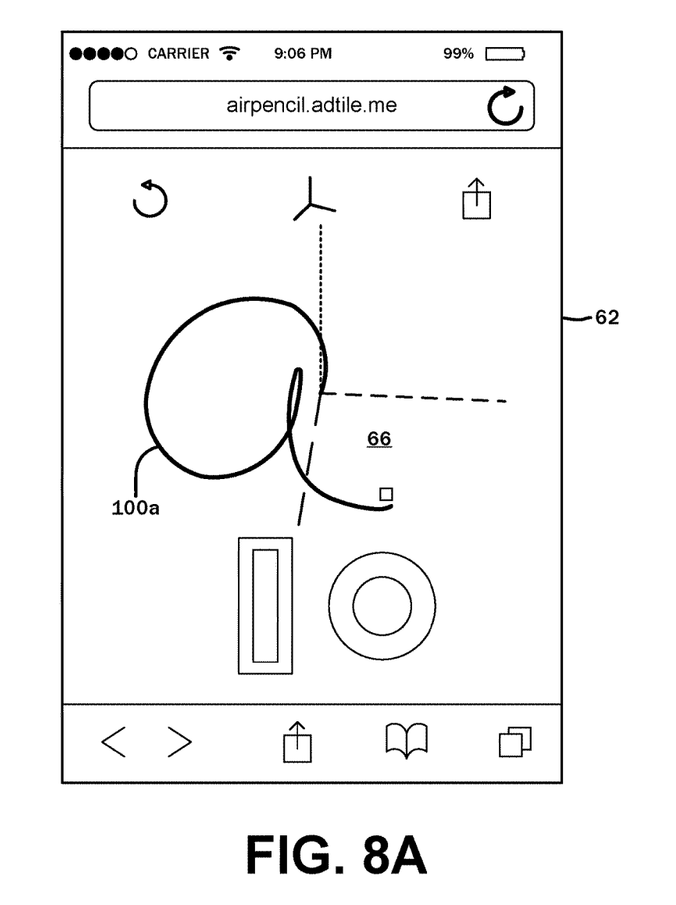
FIGS. 8A-8C are screen captures showing graphical representations of input strokes corresponding to alphanumeric characters.
Figure 8B:
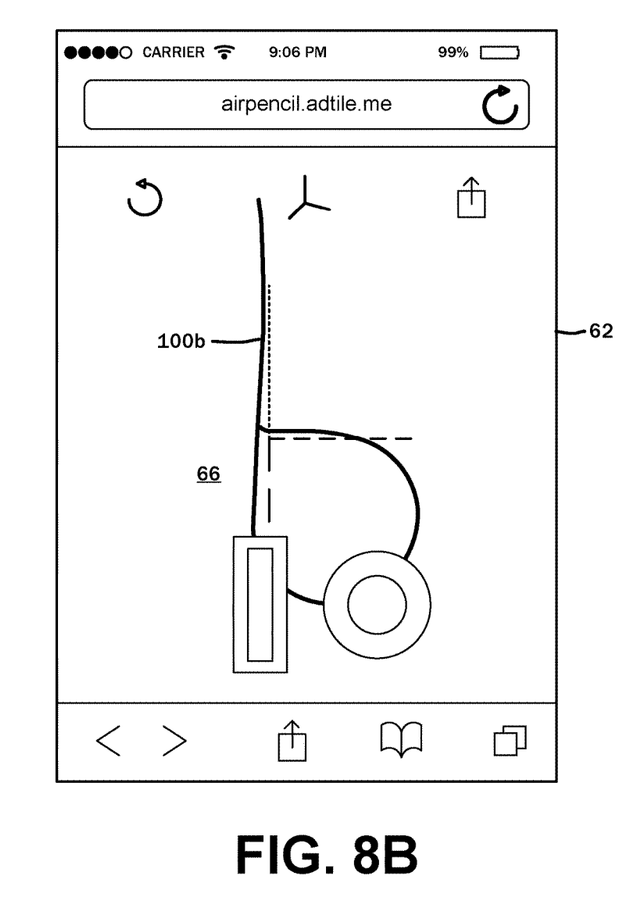
Figure 8C:
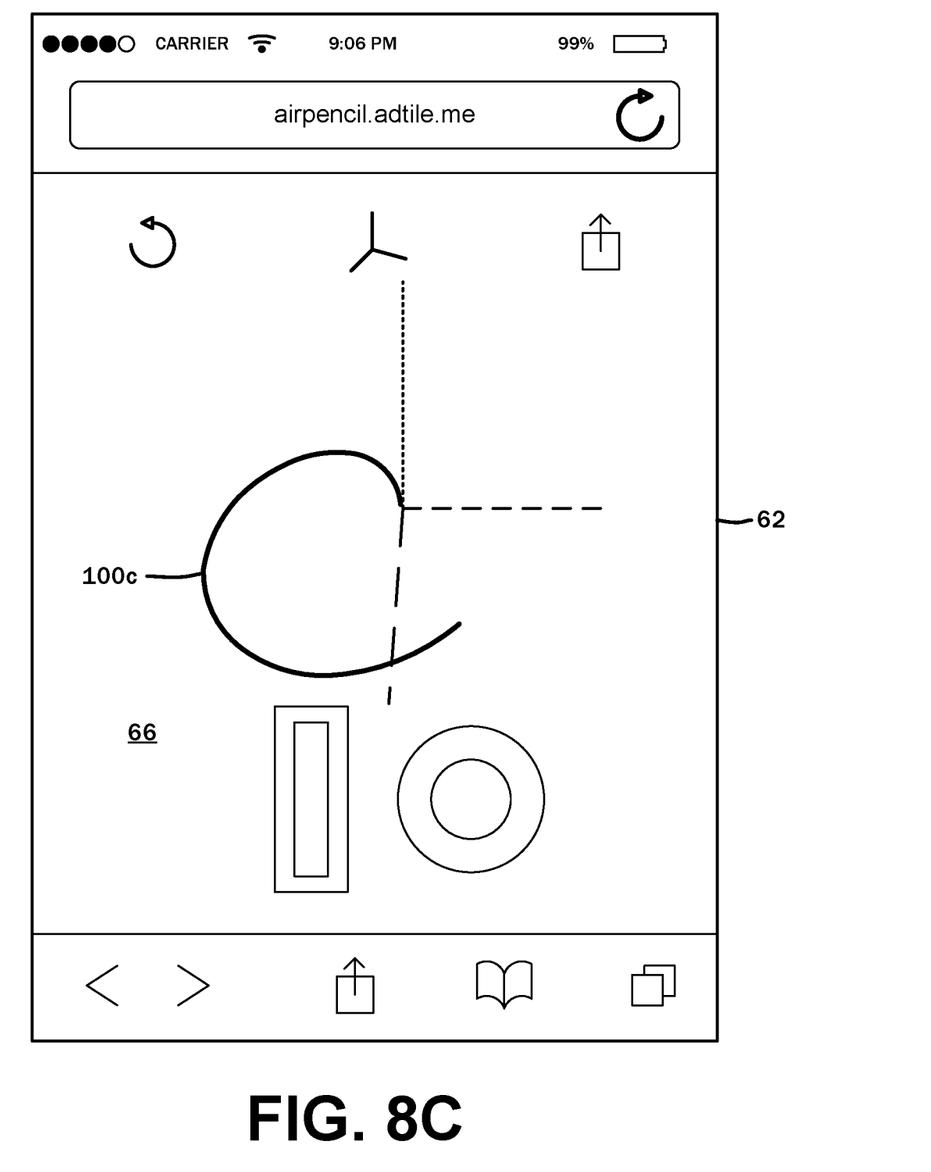

The stroke path 100 is defined by a plurality of position points within the virtual three-dimensional space 66, each of which are relative to the starting point or origin. The position is updated based upon the accelerometer 46, as well as the gyroscope 48 and the magnetometer 50, in a procedure known in the art as position dead reckoning, as there is no other external source with which the position of the apparatus 54 may be corroborated. In accordance with the present disclosure, a high level of accuracy in capturing the motion and translating the same to the stroke path 100 can be maintained without the adverse effects of quadratic position drift. FIGS. 8A-8C illustrate examples of alphabetic characters being drawn within the virtual three-dimensional space 66, with FIG. 8A showing a stroke path 100a corresponding to a lower case "a," FIG. 8B showing a stroke path 100b corresponding to a lower case "b," and FIG. 8C showing a stroke path 100c corresponding to a lower case "c."

The present disclosure also contemplates a method for graphically representing the input stroke corresponding to a motion applied to a sensor device, which is generally understood to be the mobile device 10 or the aforementioned apparatus 54. Accordingly, while the following description will make reference to components such as the accelerometer 46, the gyroscope 48, the magnetometer 50, and the central processor 14 that were specific to the mobile device 10 and/or the apparatus 54, the method is not limited to implementation thereon. Any other device may be substituted, with component analogues thereof being readily ascertainable by those having ordinary skill in the art.

The method contemplates converting the raw sensor data to quantities that accurately represent, in the aggregate, the actual motion input by the user. With reference to the flowchart of FIG. 9, the method begins with a step 1000 of receiving acceleration data from the accelerometer of the sensor device. The acceleration data is understood to be referenced to a device frame, and corresponds to the input stroke/motion that is applied to the sensor device.

Figure 9:
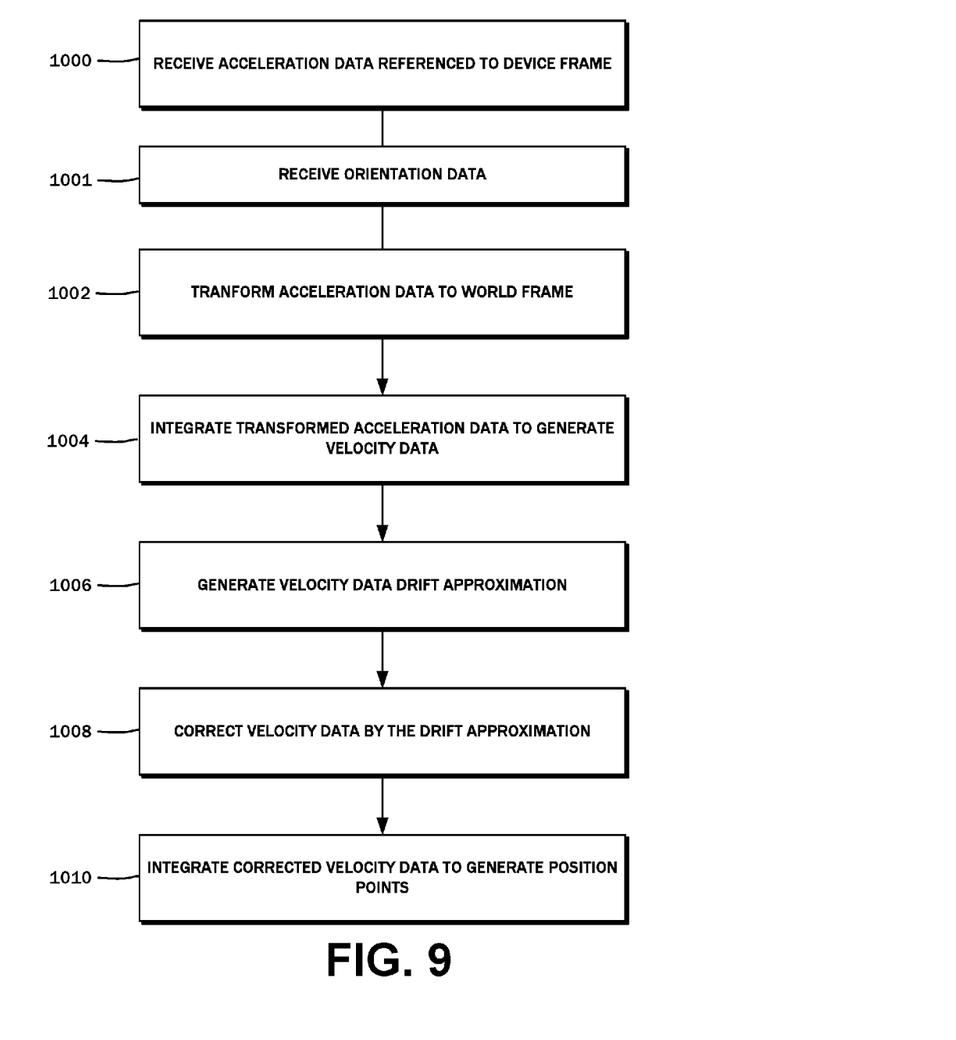
FIG. 9 is a flowchart illustrating the steps of an exemplary method for graphically representing an input stroke corresponding to a motion applied to a sensor device.

With the acceleration data received, the method proceeds to a step 1002 of transforming the same to a world frame that corresponds to the virtual three-dimensional space 66. Orientation data is utilized for this procedure, and is received from the gyroscope 48 and/or the magnetometer 50 in accordance with a step 1001 that takes place prior to the transformation step 1002.

Once the acceleration data is transformed to the world frame, velocity data is generated based upon an integration step 1004. With low cost sensors that have the potential to introduce substantial error and bias, this integration step is understood to lead to drift. Accordingly, the method also includes procedures to minimize this drift, and includes a step 1006 of generating a velocity data drift approximation, and using such value to correct the velocity data in a step 1008. There are a variety of techniques known in the art for this procedure, and any one may be substituted without departing from the scope of the present disclosure. The method then proceeds to a step 1010 of integrating the corrected velocity data to generate the position points of the input stroke. Again, the position points may be defined relative to the starting point within the virtual three-dimensional space 66.

In addition to displaying the stroke path 100 as described above with reference to FIGS. 7A, 7B, 8A, 8B, and 8C, sharing the graphic with other users is expressly contemplated. Referring again to FIG. 3, the graphical user interface 62 includes a share button 104 which may be activated to invoke content sharing functions that copies the graphic to text message recipients, e-mail recipients, social networking sites, and the like.

The particulars shown herein are by way of example and for purposes of illustrative discussion of the embodiments of the present disclosure only and are presented in the cause of providing what is believed to be the most useful and readily understood description of the principles and conceptual aspects. In this regard, no attempt is made to show details of the present invention with more particularity than is necessary, the description taken with the drawings making apparent to those skilled in the art how the several forms of the present invention may be embodied in practice.

What is claimed is:

1. A method for graphically representing an input stroke corresponding to a motion applied to a sensor device and defined by one or more position points within a three-dimensional space, the method comprising:
   receiving, on a data processor, acceleration data referenced to a device frame generated by an accelerometer on the sensor device connected to the data processor, the acceleration data corresponding to the input stroke applied to the sensor device;
   transforming, with the data processor, the received acceleration data referenced to the device frame to a world frame corresponding to the three dimensional space based upon orientation data;
   integrating, with the data processor, the transformed acceleration data referenced to the world frame to generate velocity data;
   generating, with the data processor, a velocity data drift approximation based upon a counteraction of integration error resulting from the integrating of the transformed acceleration data;
   correcting, with the data processor, the velocity data using the velocity data drift approximation; and
   integrating, with the data processor, the corrected velocity data to generate the position points of the input stroke, each of the position points being defined relative to a starting point within the three-dimensional space.

2. The method of claim 1, further comprising:
   displaying a graphical representation of the input stroke as defined by the generated position points.

3. The method of claim 2, wherein the graphical representation of the input stroke is displayed on a mobile device.

4. The method of claim 3, wherein the data processor and the sensor device is integrated into the mobile device.

5. The method of claim 3, wherein the sensor device is separate from the mobile device.

6. The method of claim 1, wherein transforming the received acceleration data is in response to a capture initiation command.

7. The method of claim 1, wherein the orientation data is derived from a gyroscope integrated into the sensor device.

8. The method of claim 7, wherein the orientation data is derived from a combination of the gyroscope and a magnetometer, the magnetometer being integrated into the sensor device.

9. An apparatus for generating a graphical representation of a motion input applied to one or more sensors, the apparatus comprising:
a touch input display screen;
a motion input capture module receptive to data corresponding to the motion input applied to and detected by the one or more sensors; and
a graphical user interface generated on the touch input display screen with a view of a virtual three-dimensional space being displayed thereon and including one or more interactive elements activatable in response to an input received on the touch input display screen, the graphical user interface having a virtual space viewing mode and a brush stroke input mode;
wherein the view of the virtual three-dimensional space is adjustable in response to the motion input as detected by the one or more sensors based upon the data received by the motion input capture module in the virtual space viewing mode, and a stroke path derived from data corresponding to the motion input as detected by the one or more sensors being generated in a brush stroke input mode, the stroke path being defined by a plurality of position points within the virtual three-dimensional space each relative to a starting point as derived by position dead reckoning using a double integration of acceleration data corrected for drift intermediately before integrating velocity data generated from a first integration to yield the position points of the stroke path in a second integration.

10. The apparatus of claim 9, wherein the motion input is a rotation, and the view of the virtual three-dimensional space is rotated in response thereto.

11. The apparatus of claim 9, wherein the view of the virtual three-dimensional space is adjustable in response to an activation of the one or more interactive elements.

12. The apparatus of claim 11, wherein the one of the one or more interactive elements is a omnidirectional panning joystick, the view of the virtual three-dimensional space displayed in the graphical user interface being panned in a direction of activation of the omnidirectional panning joystick.

13. The apparatus of claim 11, wherein the one of the one or more interactive elements is a zooming joystick, the view of the virtual three-dimensional space displayed in the graphical user interface being selectively expanded and contracted based upon activation of the zooming joystick.

14. The apparatus of claim 9, wherein a graphical representation of the stroke path is displayed in the graphical user interface.

15. The apparatus of claim 9, wherein one of the one or more sensors is an accelerometer.

16. The apparatus of claim 9, wherein one of the one or more sensors is a gyroscope.

17. The apparatus of claim 9, wherein one of the one or more sensors is a magnetometer.

18. The apparatus of claim 9, wherein the one or more sensors are physically integrated into the apparatus.

19. The apparatus of claim 9, wherein the one or more sensors are physically separated from the apparatus.

20. The apparatus of claim 9 wherein the brush stroke input mode is activated while an input is being provided to the touch input display screen.

21. An article of manufacture comprising a non-transitory program storage medium readable by a data processor, the medium tangibly embodying one or more programs of instructions executable by the data processor to perform a method for graphically representing an input stroke corresponding to a motion applied to a sensor device, the method comprising:
receiving, on the data processor, acceleration data generated by one or more motion sensors on the sensor device connected to the data processor, the acceleration data corresponding to the input stroke applied to the sensor device and referenced to a device frame;
transforming, with the data processor, the acceleration data referenced to the device frame to a world frame corresponding to the three dimensional space;
integrating, with the data processor, the transformed acceleration data referenced to the world frame to generate velocity data;
generating, with the data processor, a velocity data drift approximation based upon a counteraction of integration error resulting from the integrating of the transformed acceleration data;
correcting, with the data processor, the velocity data using the velocity data drift approximation; and
integrating, with the data processor, the corrected velocity data to generate the position points of the input stroke.

22. The article of manufacture of claim 21, wherein the one or more programs of instruction are executed within a web browser application.

23. The article of manufacture of claim 21, wherein the one or more programs of instruction is a native application running on a mobile platform.

* * * * *